United States Patent
Cai et al.

(10) Patent No.: US 11,551,284 B2
(45) Date of Patent: Jan. 10, 2023

(54) SESSION-BASED RECOMMENDATION METHOD AND DEVICE

(71) Applicant: National University of Defense Technology, Hunan (CN)

(72) Inventors: Fei Cai, Hunan (CN); Chengyu Song, Hunan (CN); Yitong Wang, Hunan (CN); Zhiqiang Pan, Hunan (CN); Xin Zhang, Hunan (CN); Mengru Wang, Hunan (CN); Wanyu Chen, Hunan (CN); Honghui Chen, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/745,121

(22) Filed: May 16, 2022

(65) Prior Publication Data

US 2022/0374962 A1     Nov. 24, 2022

(30) Foreign Application Priority Data

May 17, 2021   (CN) .......................... 202110533473.8

(51) Int. Cl.
*G06Q 30/06*     (2012.01)
*G06N 3/04*      (2006.01)
*G06Q 30/02*     (2012.01)

(52) U.S. Cl.
CPC ....... *G06Q 30/0631* (2013.01); *G06N 3/0472* (2013.01); *G06Q 30/0202* (2013.01)

(58) Field of Classification Search
CPC ........... G06Q 30/0631; G06Q 30/0202; G06N 3/0472
See application file for complete search history.

(56) References Cited

PUBLICATIONS

Qiu et al., "Rethinking the Item Order in Session-based Recommendation with Graph Neural Networks", Nov. 7, 2019, CIKM '19, pp. 579-588. (Year: 2019).*

Qiu et al., "Exploiting Cross-session Information for Session-based Recommendation with Graph Neural Networks", May 2020, ACM Transactions on Information Systems, vol. 38, No. 3, Article 22, pp. 1-23. (Year: 2020).*

* cited by examiner

*Primary Examiner* — Brent Johnston Hoover
(74) *Attorney, Agent, or Firm* — Dragon Sun Law Firm, PC; Jinggao Li; Nathaniel Perkins

(57) ABSTRACT

A session-based recommendation method and device according to one or more embodiments of this disclosure are provided, which use a pre-trained recommendation model to perform item recommend. The method includes following contents: a directed session graph is constructed according to a session to be predicted; the directed session graph is then input into a gated graph neural network which outputs the item embedding vector; a user's dynamic preference is determined according to a user's current preference and a first long-term preference, the current preference is an item embedding vector of a last item in the session and the first long-term preference is determined according to the item embedding vector and an importance score of the item; a prediction score of a respective item is determined according to the dynamic preference and the item embedding vector; and a recommended item is output according to the prediction score of the respective item.

10 Claims, 16 Drawing Sheets

| |
|---|
| Learning Algorithm of CGL |
| Input: a session $S_\tau = \{v_1, v_2, \ldots, v_n\}$. |
| Output: the item embedding vector $V$ and parameters $\psi$ in UPG. |
| 1: $z^d = D - UPG(S_\tau)$; |
| 2: $y^p = \text{Prediction}(z^d, V)$; |
| 3: $y^{soft} = \text{SimilarityLayer}(v_{tar}, V)$; |
| 4: $y^c = \text{Combine}(y^{soft}, y^{hard})$; |
| 5: $L_{main} = \text{KLD}(y^p, y^c)$; |
| 6: construct $G_g$ based on a global connection; |
| 7: $S_i, \tilde{S}_j = \text{Sample}(G_g, S_\tau)$; |
| 8: $z_\tau^l, z_i^l, z_j^l = L - UPG(S_\tau, S_i, \tilde{S}_j)$; |
| 9: $L_{ssl} = \text{JSD}(z_\tau^l, z_i^l, z_j^l)$; |
| 10: optimize the loss function: $L = L_{main} + \lambda L_{ssl}$; |
| 11: update parameters $V$ and $\psi$ using back propagation; |
| 12: Return $V$ and $\psi$. |

FIG. 3

SESSION-BASED RECOMMENDATION METHOD AND DEVICE

CROSS-REFERENCE TO RELATED APPLICATION

This application claims priority from the Chinese patent application 202110533473.8 filed May 17, 2021, the content of which is incorporated herein in the entirety by reference.

TECHNICAL FIELD

One or more embodiment of this disclosure relates to a technical field of artificial intelligence, in particular to a session-based recommendation method and device.

BACKGROUND

At present, an online platform generally is designed with a recommendation system, which analyzes user preferences in an interaction process between users and the system, screen out items that the users may be interested in from mass items according to the user preferences, and recommend them to the users, thus facilitating transactions. In an existing recommendation system, items are generally expressed by one-hot coding, which easily leads to over-fitting of a model and reduces recommendation accuracy.

SUMMARY

In view of this, purposes of one or more embodiments of this disclosure are to propose a session-based recommendation method and device, which can improve accuracy of item recommendation.

On a basis of above purposes, a session-based recommendation method is provided in one or more embodiments of this disclosure, which uses a pre-trained recommendation model to recommend items. The method includes:

constructing a directed session graph according to a session to be predicted, the session including at least one item that a user interacts with a system;

inputting the directed session graph into a gated graph neural network which outputs an item embedding vector;

determining a dynamic preference of the user according to a current preference and a first long-term preference of the user, the current preference being an item embedding vector of a last item in the session and the first long-term preference being determined according to the item embedding vector and an importance score of the item;

determining a prediction score of a respective item according to the dynamic preference and the item embedding vector; and outputting a recommended item according to the prediction score of the respective item.

Optionally, the method further includes, after determining the prediction score of the respective item:

calculating a label distribution of the item;

determining a first loss function according to the prediction score and the label distribution; and optimizing the recommendation model according to the first loss function.

Optionally, calculating the label distribution of the item includes:

calculating similarities between a target item and all of items in an item set to obtain a soft label vector constructed of the similarities between the target item and all of the items;

one-hot coding all of the items to obtain hard label vectors of all of the items represented by one-hot coding; and determining the label distribution according to the soft label vector and the hard label vectors.

Optionally, the method further includes:

calculating similarities between the session and other sessions;

determining neighbor sessions with top m greatest similarities and remaining non-neighbor sessions;

calculating respective second long-term preferences according to the session, the neighbor sessions and the non-neighbor sessions respectively;

determining a second loss function according to the second long-term preferences for the session, the neighbor sessions and the non-neighbor sessions; and optimizing the recommendation model according to the first loss function and the second loss function.

Optionally, the first long-term preference is determined by a dynamic readout function, and the second long-term preferences are determined by a long-term readout function.

Optionally, the first loss function is a KL divergence function and the second loss function is a JS divergence function.

Optionally, the importance score of the item is generated by an attention mechanism.

In an embodiment of this disclosure, a session-based recommendation device is further provided, which uses a pre-trained recommendation model to recommend items and includes a construction module, an item representation module, a preference determination module, a prediction module and a recommendation module.

The construction module is configured for constructing a directed session graph according to a session to be predicted, and the session includes at least one item that a user interacts with a system.

The item representation module is configured for inputting the directed session graph into a gated graph neural network which outputs an item embedding vector.

The preference determination module is configured for determining a dynamic preference of the user according to a current preference and a first long-term preference of the user. The current preference is an item embedding vector of a last item in the session and the first long-term preference is determined according to the item embedding vector and an importance score of the item.

The prediction module is configured for determining a prediction score of a respective item according to the dynamic preference and the item embedding vector.

The recommendation module is configured for outputting a recommended item according to the prediction score of the respective item.

Optionally, the device further includes a first calculation module and an optimization module.

The first calculation module is configured for calculating a label distribution of the item.

The optimization module is configured for determining a first loss function according to the prediction score and the label distribution; and for optimizing the recommendation model according to the first loss function.

Optionally, the device further includes a second calculation module, a neighbor determination module, a second preference determination module and a joint optimization module.

The second calculation module is configured for calculating similarities between the session and other sessions.

The neighbor determination module is configured for determining neighbor sessions with top m greatest similarities and remaining non-neighbor sessions.

The second preference determination module is configured for calculating respective second long-term preferences according to the session, the neighbor sessions and the non-neighbor sessions respectively.

The joint optimization module is configured for determining a second loss function according to the second long-term preferences for the session, the neighbor sessions and the non-neighbor sessions; and for optimizing the recommendation model according to the first loss function and the second loss function.

It can be seen from the above that, in the session-based recommendation method and device according to one or more embodiments of this disclosure, the pre-trained recommendation model is adopted to perform item recommend; the directed session graph is constructed according to the session to be predicted, the directed session graph is then input into the gated graph neural network which outputs the item embedding vector; the user's dynamic preference is determined according to the user's current preference and the first long-term preference, the prediction score of the respective item is determined according to the dynamic preference and the item embedding vector, and a recommended item is output according to the prediction score of the respective item. With this disclosure, accuracy of item recommendation can be improved.

BRIEF DESCRIPTION OF THE DRAWINGS

In order to explain one or more embodiments of this disclosure or the technical scheme in the prior art more clearly, the drawings required in the description of the embodiments or the prior art will be briefly introduced below; obviously, the drawings in the following description are only one or more embodiments of this disclosure, and other drawings can be obtained according to these drawings by those of ordinary skill in the art without paying creative labor.

FIG. 3 is a schematic diagram of an algorithm flow according to one or more embodiments of this disclosure;

DETAILED DESCRIPTION

In order to make the objects, technical schemes and advantages of the disclosure more clear, the disclosure will be further described in detail with reference to specific embodiments and drawings.

It should be noted that, unless otherwise defined, technical terms or scientific terms used in one or more embodiments of this disclosure shall have a general meaning understood by those with general skills in the field to which this disclosure pertains. Words "first", "second" and the like used in one or more embodiments of this disclosure do not indicate any order, quantity or importance, but are only used to distinguish different components. Similar words such as "including" or "containing" mean that the elements or objects appearing before the words encompass listed elements or objects appearing after the word and their equivalents, with other elements or objects being not excluded. Similar words such as "connected to" or "connected with" are not limited to physical or mechanical connection, but can include electrical connection, direct or indirect. An expression such as "upper", "lower", "left" and "right" is only used to express a relative positional relationship. When an absolute position of a described object changes, the relative positional relationship may also change accordingly.

Hereinafter, technical schemes of the present disclosure will be further explained in detail through specific embodiments.

Figure 1:
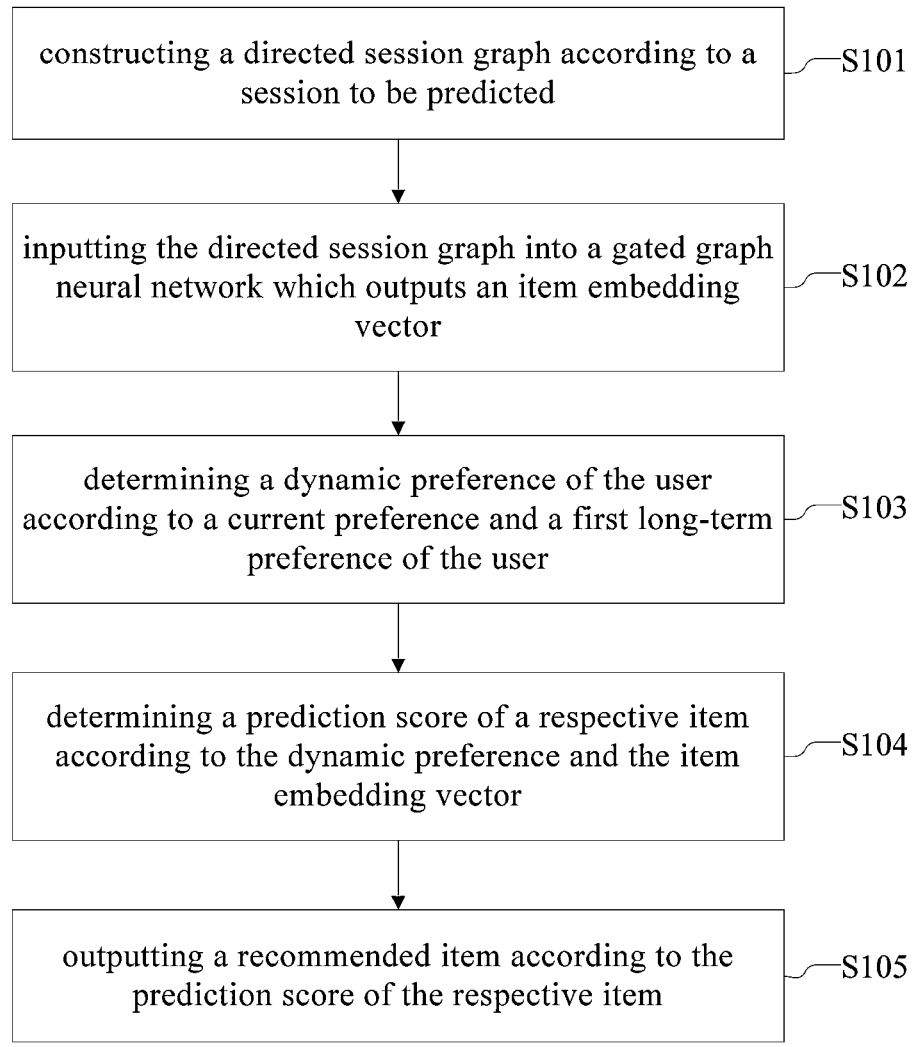
FIG. 1 is a schematic diagram of a method flow according to one or more embodiments of this disclosure.
Figure 2:
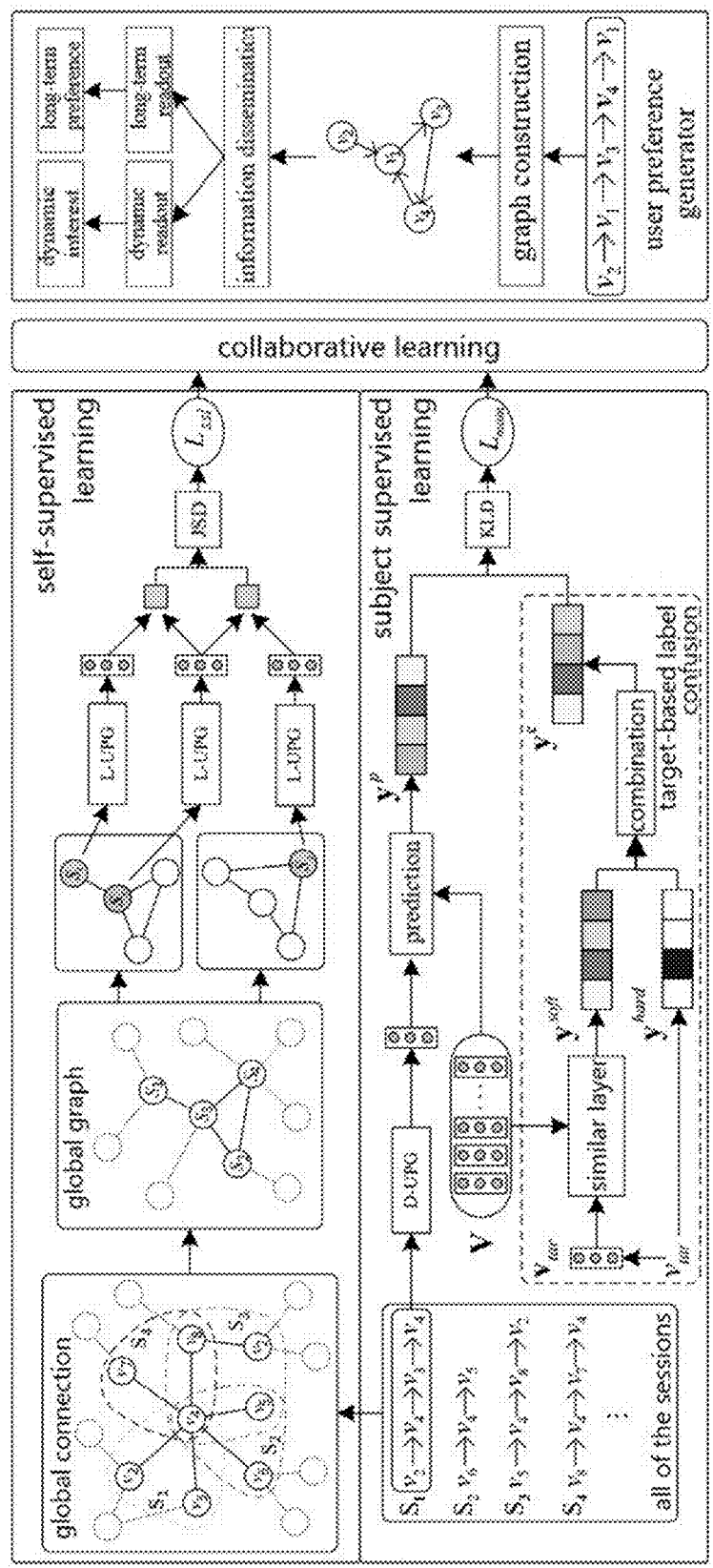
FIG. 2 is a block diagram of a recommendation model according to one or more embodiments of this disclosure.
Figure 4A:
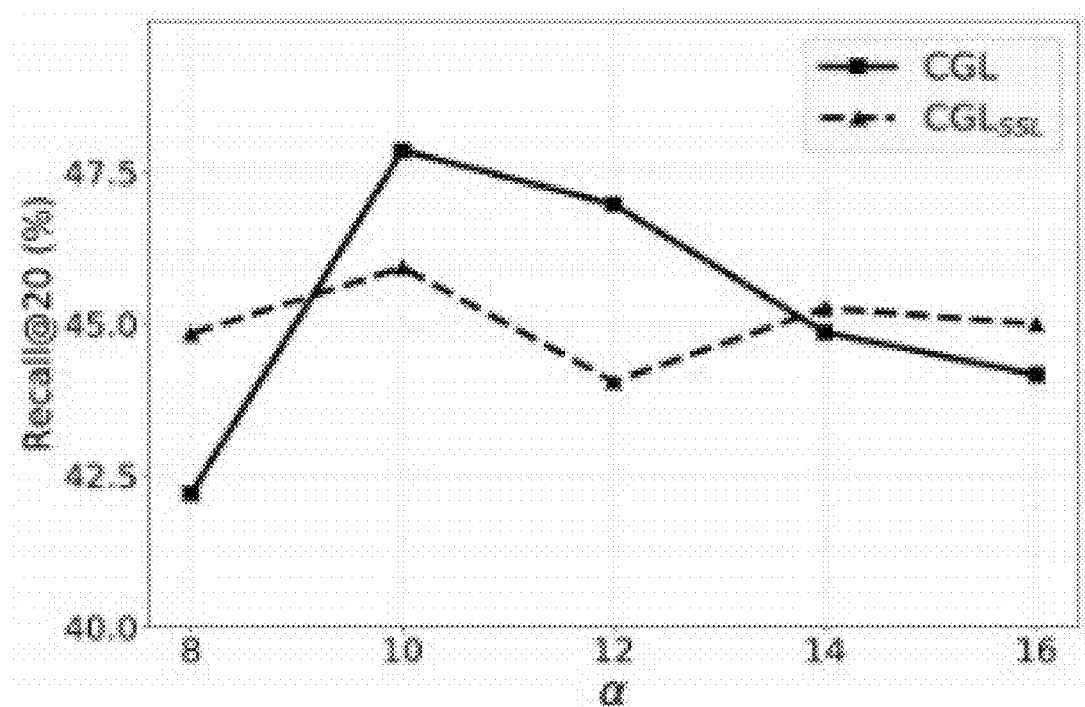
FIGS. 4A, 4B, 4C and 4D are schematic diagrams of model performance corresponding to different label weighing parameters on two data sets respectively.
Figure 4B:
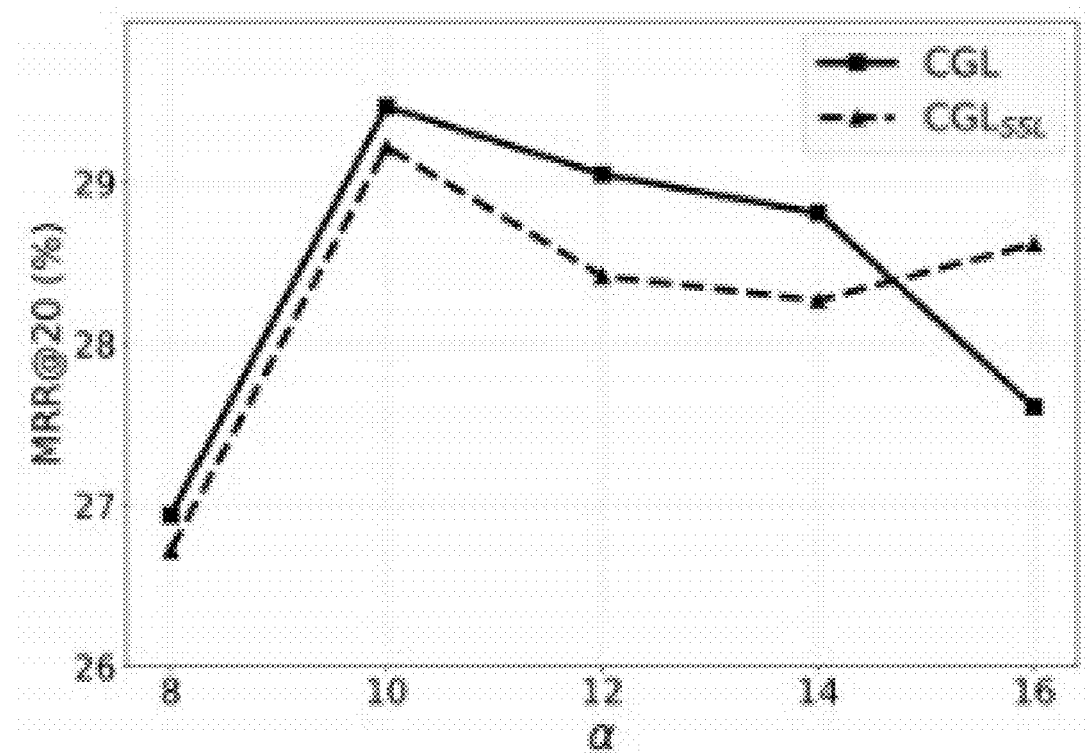
Figure 4C:
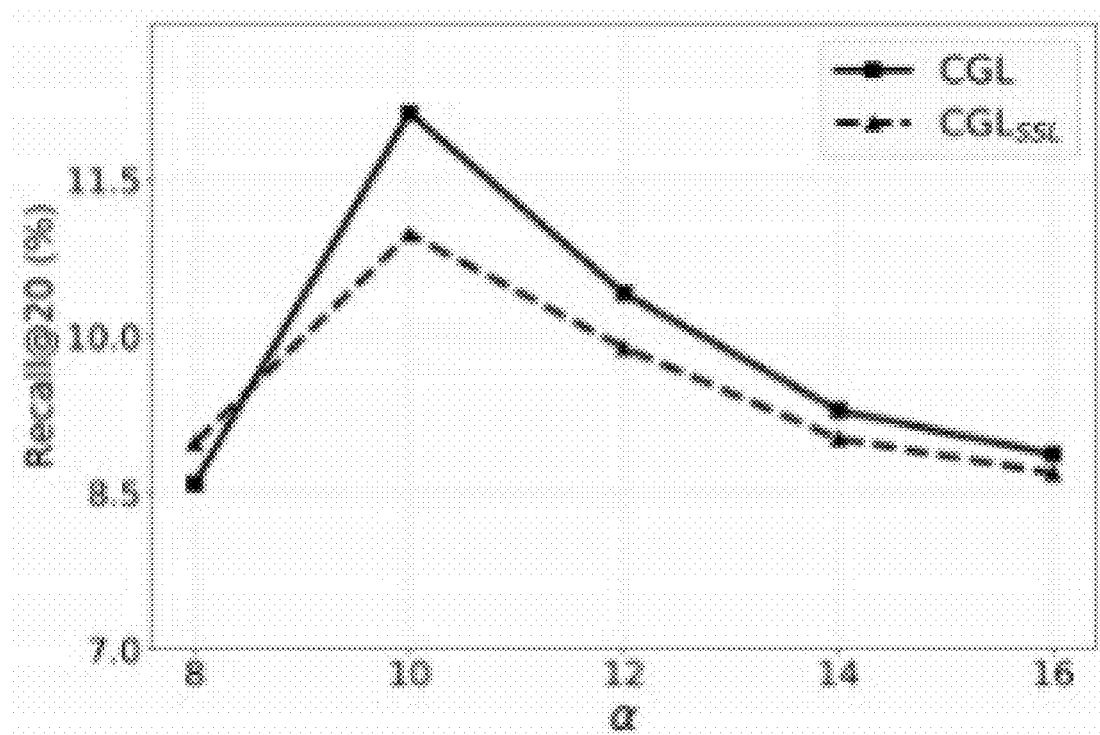
Figure 4D:
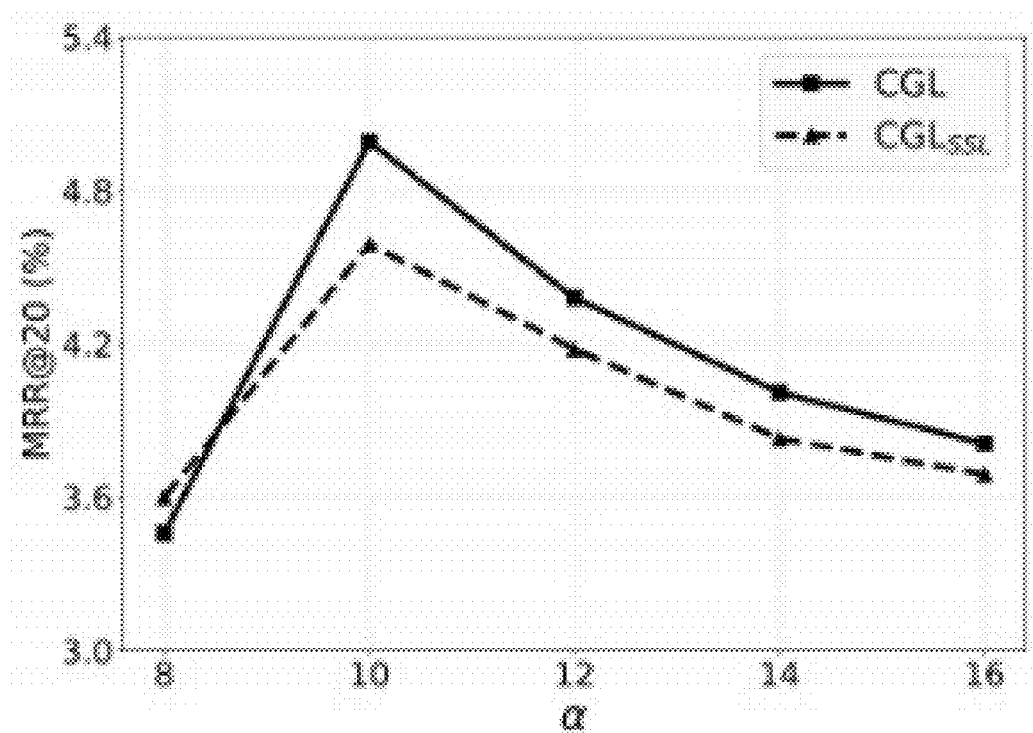
Figure 5A:
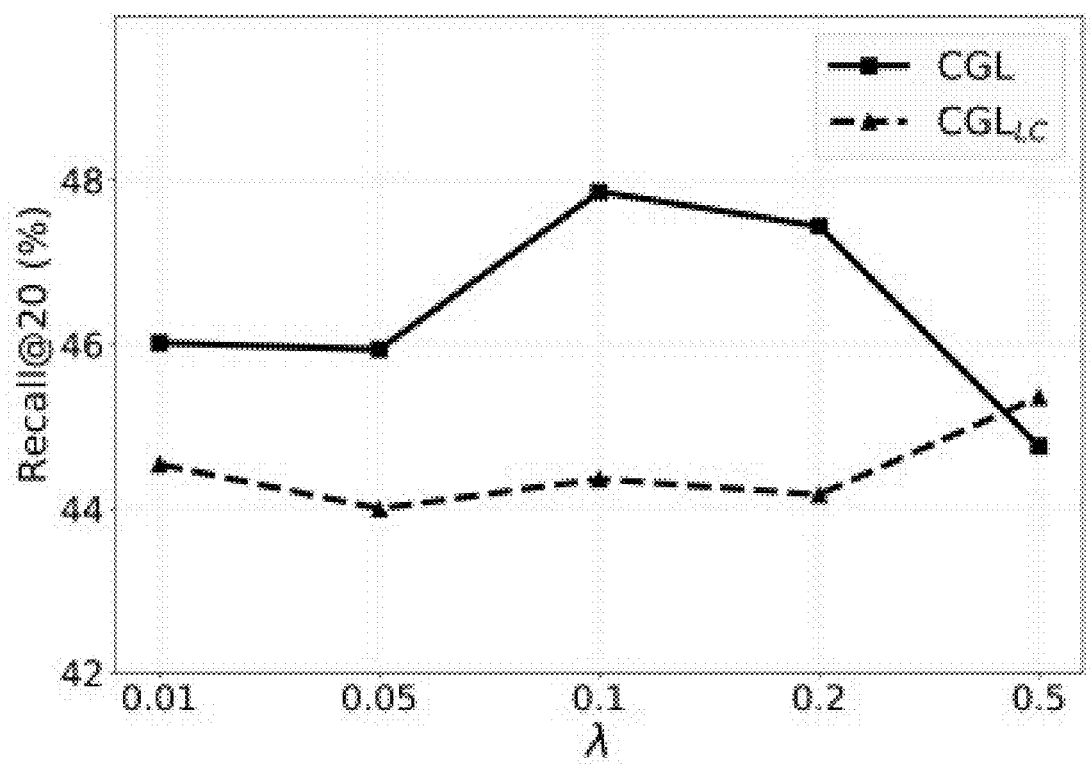
FIGS. 5A, 5B, 5C and 5D are schematic diagrams of model performance corresponding to different loss weighing parameters on two data sets respectively.
Figure 5B:
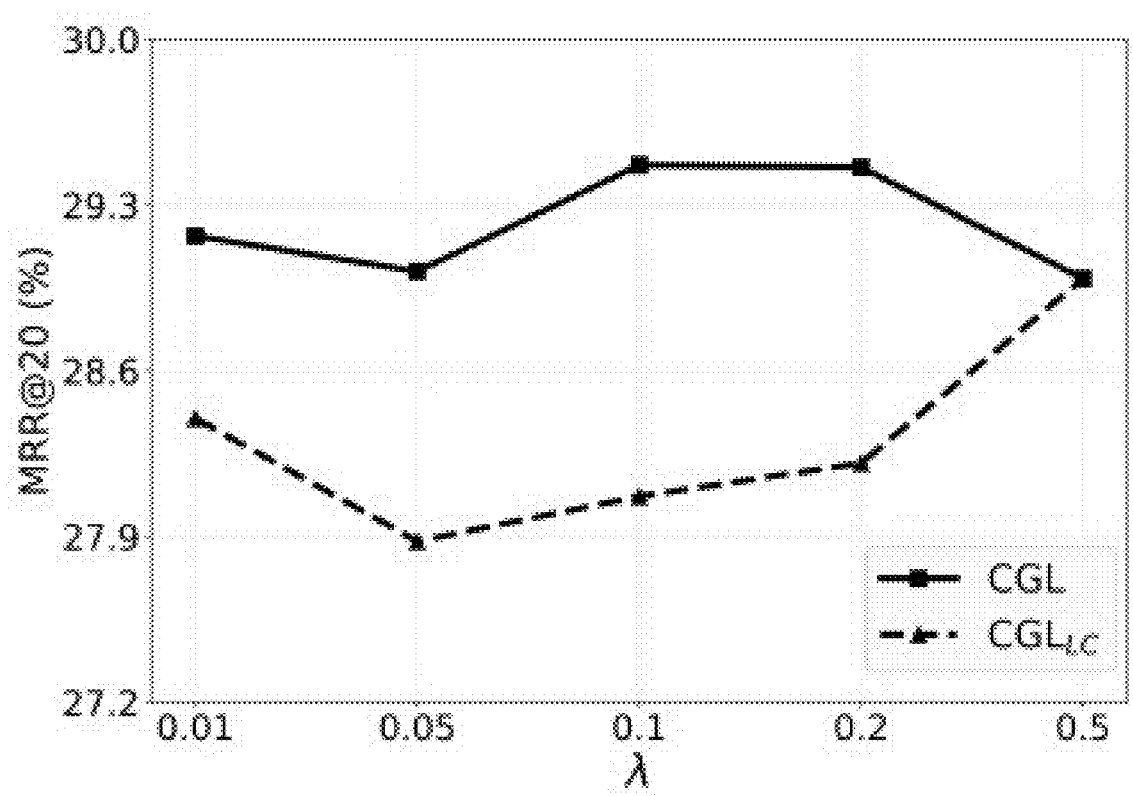
Figure 5C:
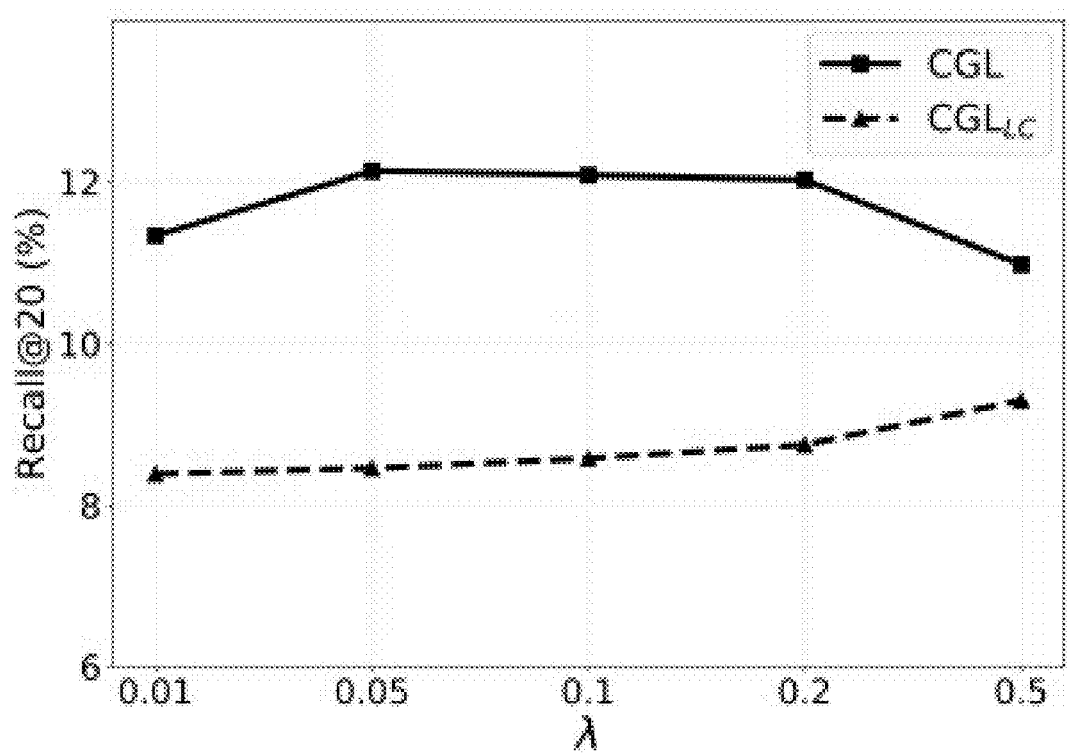
Figure 5D:
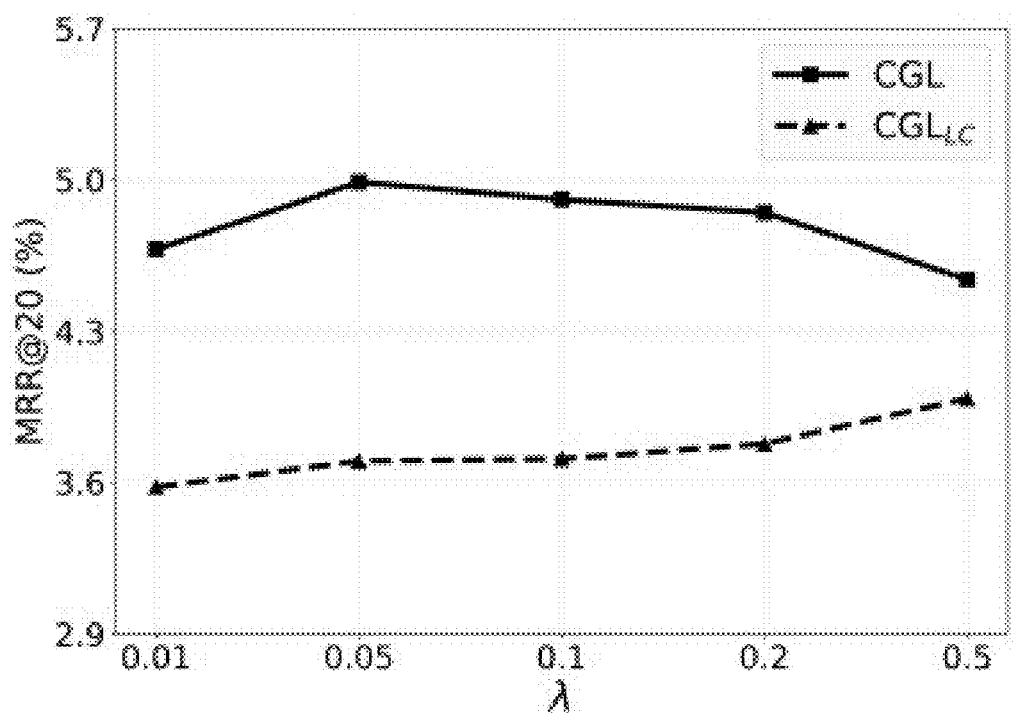
Figure 6A:
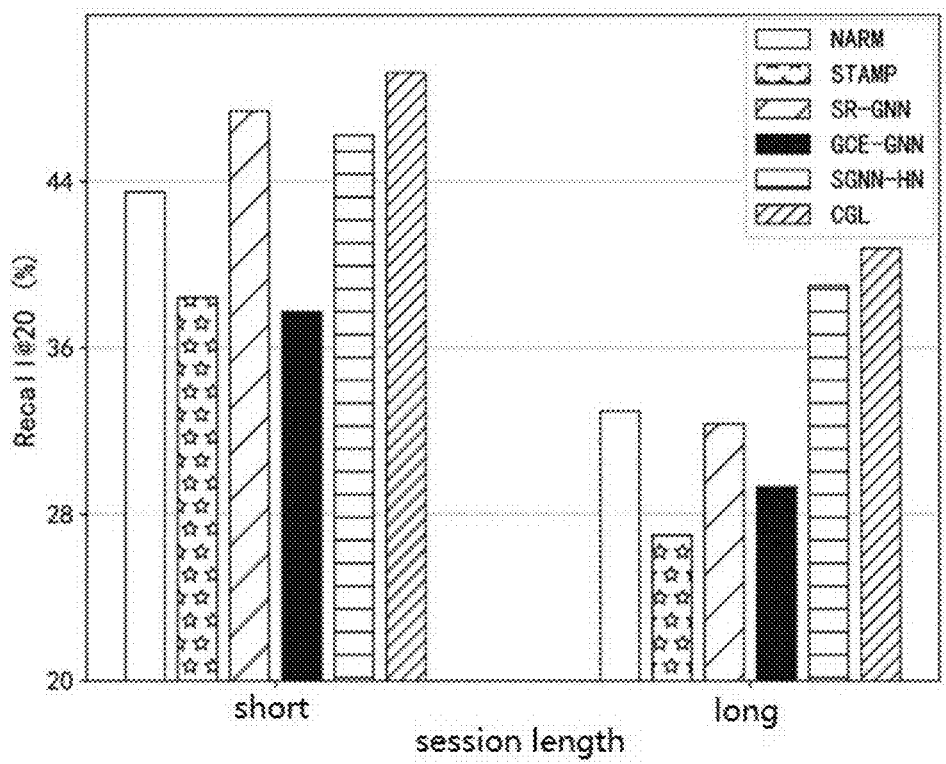
FIGS. 6A, 6B, 6C and 6D are schematic diagrams of model performance corresponding to different session lengths on two data sets respectively.
Figure 6B:
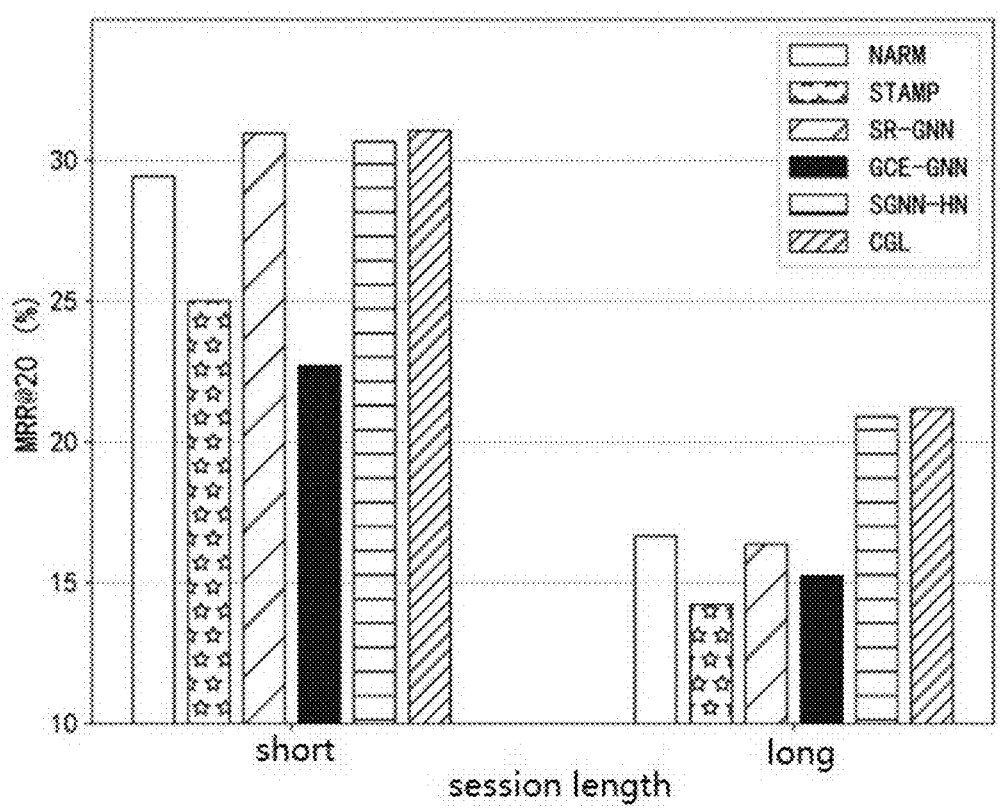
Figure 6C:
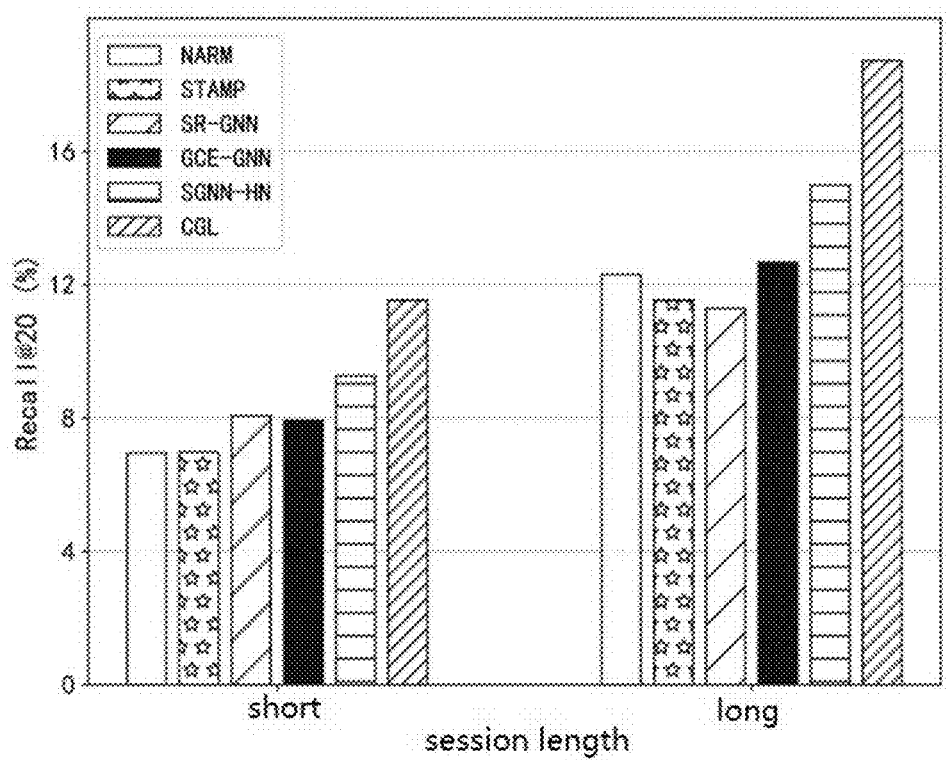
Figure 6D:
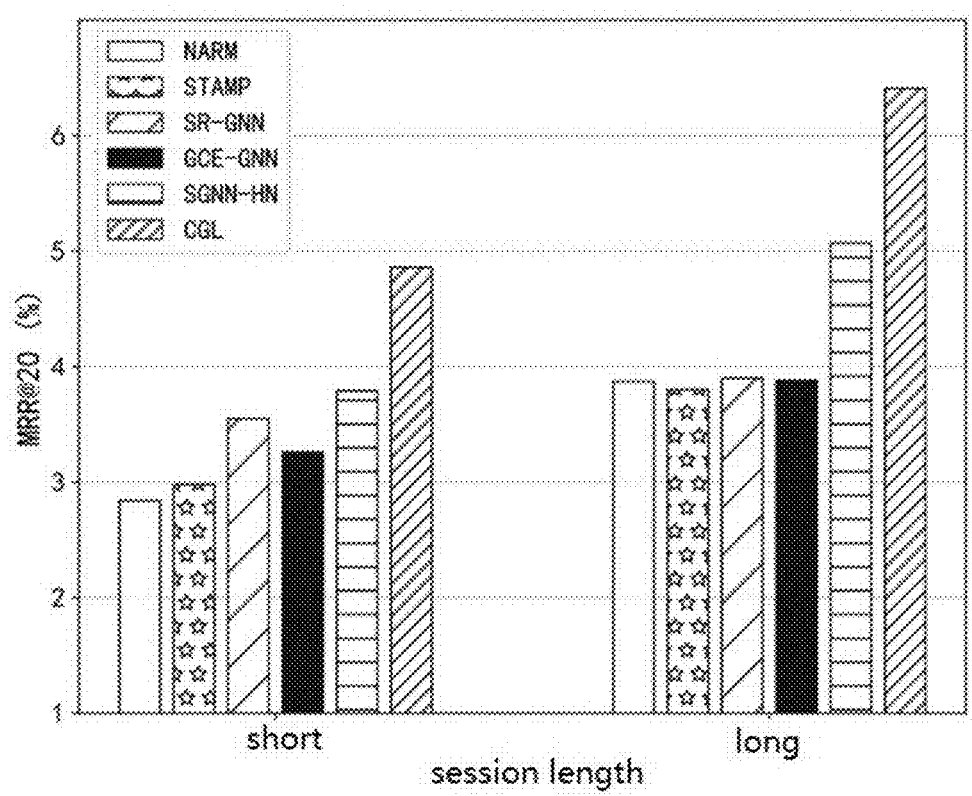

As shown in FIGS. 1 and 2, a session-based recommendation method is provided in one or more embodiments of this disclosure, which uses a pre-trained recommendation model to recommend items. The recommendation method includes S101 to S105.

In S101, a directed session graph is constructed according to a session to be predicted, the session includes at least one item that a user interacts with a system.

In this embodiment, the session includes at least one item clicked in sequence during interaction between the user and the system. With the recommendation method of this embodiment, the session to be predicted is input into the recommendation model, and predicted recommended items that users may be interested in can be output.

In some ways, an item set $V=\{v_1, v_2, \ldots, v_{|V|}\}$ is set to represent all of the items, $|V|$ is a number of the items in the item set V. The session set is set as $U=\{S_1, S_2, \ldots, S_\tau, \ldots, S_{|U|}\}$, $|U|$ is a number of sessions in the session set U, $S_\tau=\{v_1, v_2, \ldots, v_t, \ldots, v_n\}$ represents a τ-th session, and the session $S_\tau$ contains n items, $v_t$ represents an item that interact at a t-th moment in the session $S_\tau$. With the recommendation method of this embodiment, the session $S_\tau$ is input into the recommendation model, and the recommendation model outputs probability that each of the items in the item set V is recommended to the user, that is $p(v_{n+1}|v_{1:n})$, on this basis, the items with the N highest probabilities can be composed into a recommendation list and recommended to the user.

In S102, the directed session graph is input into a gated graph neural network which outputs an item embedding vector.

In this embodiment, an accurate item embedding vector is generated based on a graph learning method, which includes two steps: firstly, the directed session graph is constructed according to the session; then, the item embedding vector used to represent respective item in the session is learned according to the directed session graph and by information dissemination on the directed session graph, which is expressed as:

$$G_I = \text{Seq2Graph}(S_\tau)$$

$$X = GNN(G_I) \tag{1}$$

where $G_I$ is the directed session graph constructed according to the session $S_\tau$, and X is the item embedding vector in the session learned based on the directed session graph, Seq2Graph represents a graph construction and GNN represents information dissemination operation.

In S103, a dynamic preference of the user is determined according to a current preference and a first long-term preference of the user, the current preference is an item embedding vector of a last item in the session and the first long-term preference is determined according to the item embedding vector and an importance score of the item.

In this embodiment, the dynamic preference of the user is determined according to the current preference $z_r^d$ and the first long-term preference $z_l^d$ of the user, which is expressed as:

$$z^d = \text{Readout}_d(v_{1:n}) = W_1[z_l^d; z_r^d] \quad (2)$$

where Re a dout$_d$ is a dynamic read function, is a connection operation, d is a dimension of the embedding vector of the item, $W_1 \in R^{d \times 2d}$ and Re a dout$_d$ is a trainable parameter used to control weights in this process. A readout function Readout is a function used in the graph neural network to aggregate node features to obtain a representation vector of the whole graph.

In some ways, because a last item in the session can represent an item that the user is currently interested in, an item embedding vector $v_n$ of the last item in the session is taken as the current preference $z_r^d$ of the user, that is $z_r^d = v_n$.

The first long-term preference $z_l^d$ of the user is determined according to the importance score of the item and the item embedding vector. The importance score $\alpha_i^d$ of the item can be generated by an attention mechanism, which is expressed as:

$$z_l^d = \sum_{i=1}^{n} \alpha_i^d v_i \quad (3)$$

$$\alpha_i^d = \text{Softmax}(\beta_i^d)$$

$$\beta_i^d = W_2 \sigma(W_3 v_i + W_4 z_r^d + b^d)$$

where $W_2 \in R^{1 \times d}, W_3, W_4 \in R_{d \times d}$ are trainable parameters used to control weights in the attention mechanism, $b^d \in R^d$ is a bias vector, σ represents a sigmoid function, and i is an integer.

In S104, the prediction score of the respective item is determined according to the dynamic preference and the item embedding vector.

In this embodiment, the prediction score $y_i^p$ of each item is determined according to the obtained user's dynamic preference $z^d$ and the item embedding vector $v_i$ of each item, which is expressed as:

$$y_i^p = \text{Soft max}(z^{d^T} v_i) \quad (4)$$

where $y_i^p \in R^{|v|}$, $z^{d^T}$ is transpose of $z^d$, and the Softmax function is used to normalize the prediction score.

In S105, a recommended item is output according to the prediction score of the respective item.

In this embodiment, after determining the predicted score of the respective item, the items can be sorted according to an order of their predicted scores from high to low, and a top predetermined number of the items are used as recommended items to form a recommendation list, and the recommendation list is output, which is convenient for users to further select target items according to the recommendation list.

In the session-based recommendation method according to this embodiment, the recommendation model is adopted to perform item recommend. The recommendation method includes following content: the directed session graph is constructed according to the session to be predicted, the directed session graph is then input into the gated graph neural network which outputs the item embedding vector; the user's dynamic preference is determined according to the user's current preference and the first long-term preference, the prediction score of the respective item is determined according to the dynamic preference and the item embedding vector, and the recommended item is output according to the prediction score of the respective item. In this embodiment, by combining the accurate item embedding vector with the dynamic preference of the user, the accuracy of item recommendation can be improved.

In some embodiments, the method further includes, after determining the prediction score of the respective item:
    calculating a label distribution of the item;
    determining a first loss function according to the prediction score and the label distribution of the item; and
    optimizing the recommendation model according to the first loss function.

In this embodiment, the first loss function is determined according to the label distribution and the prediction score of the item, and the recommendation model is optimized by using the first loss function, so that recommendations from the recommendation model are more accurate.

Referring to FIG. 2, in some embodiments, the label distribution of the item is calculated by using a target-based label confusion method. The method is as follows:
    calculating similarities between a target item and all of items in an item set to obtain a soft label vector constructed of the similarities between the target item and all of the items;
    one-hot coding all of the items to obtain hard label vectors of all of the items represented by one-hot coding; and
    determining the label distribution according to the soft label vector and the hard label vectors.

In this embodiment, assuming that items similar to the target item $v_{tar}$ are close to the user's preference, the similarities between the target item and each item $v_i$ in the item set V is:

$$y_i^{soft} = \text{Soft max}(v_{tar}^T v_i) \quad (5)$$

where $v_{tar}^T$ is transpose of the item embedding vector $v_{tar}$ of the target item, $v_i$ is the item embedding vector of the item $v_i$.

The similarities between the target item and all the items in the item set constitute the soft label vector $y^{soft}, y^{soft} \in R^{|v|}$. All of the items are subjected to one-hot coding to obtain one-hot coding vectors of all of the items, and the one-hot coding vectors of all of the items constitute a hard label vector $y^{hard}, y^{hard} \in R^{|v|}$ is a one-hot coding vector and $y_i^{hard} \in y^{hard}$ is a value of the hard label vectors corresponding to an item $v_i$, and at a position corresponding to the target items, $y_i^{hard} = 1$, otherwise $y_i^{hard} = 0$. Then, according to the soft label vector and the hard label vector, the label distribution $y^c$ of the respective item is obtained as follows:

$$y^c = \text{Soft max}(y^{soft} + \alpha y^{hard}) \quad (6)$$

where $y^c \in R^{|v|}$, α is a label weighing parameter, which is used to adjust a weight between the soft label vector $y^{soft}$ and the hard label vector $y^{hard}$.

In some ways, according to the predicted score and the label distribution of the item, KL divergence is used as the first loss function to optimize the recommendation model, and the first loss function is expressed as follows:

$$L_{main} = KLD(y^c, y^p) = \sum_{i=1}^{|V|} y_i^c \log\left(\frac{y_i^c}{y_i^p}\right) \quad (7)$$

where $y_i^c$ is a label distribution of an item $v_i$ and $y_i^p$ is a predicted score of an item $v_i$.

In this embodiment, considering that a current recommendation system generally uses a cross entropy loss function to compare the predicted score distribution with the user preference distribution (i.e. the label distribution), the model parameters are optimized. Because it is impossible for users to interact with all of the items, users' real preference is usually unknown. With simply regarding the one-hot coding of the target item as a real distribution of the users' preference, the prediction score of the target item can be improved and the prediction scores of other items are reduced. Moreover, when the embedding vector of the item is with one-hot coded, coding results of negative sample items and non-target items are the same, which makes it impossible to distinguish the negative sample items. In this embodiment, the target-based label confusion method is adopted, the similarities between the target item and other items are taken as soft label vectors, the one-hot coding vectors of other items are taken as hard label vectors, and a mixture of the soft label vector and the hard label vector is taken as a final label distribution, so that negative sample items can be effectively distinguished, and meanwhile KL divergence is used as the first loss function for optimization, which can effectively prevent an over-fitting problem.

As shown in FIG. 2, in a subject supervised learning part of the recommendation model, the session S1 to be predicted is input into the recommendation model, the item embedding vector of the item in the session is generated by a dynamic preference generator D-UPG based on the graph learning method according to the session S1, the user's dynamic preference is determined according to the item embedding vector, and the prediction score of the respective item is determined according to the dynamic preference and the item embedding vector. The label distribution of the item is generated by using the target-based label confusion method. Then, the first loss function $L_{main}$ is calculated according to the predicted score and label distribution of the item, and the recommendation model is optimized by using the first loss function, so that the recommendation model can output accurate item recommendations.

In some embodiments, the recommendation method further includes:

calculating similarities between the session to be predicted and other sessions;

determining neighbor sessions with top m greatest similarities and remaining non-neighbor sessions according to the similarities between sessions and other sessions;

calculating respective second long-term preferences according to the session, the neighbor sessions and the non-neighbor sessions respectively;

determining a second loss function according to the second long-term preferences for the session, the neighbor sessions and the non-neighbor sessions; and optimizing the recommendation model according to the first loss function and the second loss function.

In this embodiment, in order to improve the prediction accuracy, relationships between different sessions are comprehensively considered. Specifically, according to all the sessions in the session set U, a global graph $G_g=\{V_g, \varepsilon_g\}$ including respective sessions as session nodes is constructed, where $V_g$ represents a set of session nodes in the global graph, and $\varepsilon_g$ is a set of edges in the global graph. The similarities between the session and other sessions in the session set are calculated, and according to the calculated similarities between the session and other sessions, a max sampling (taking sessions with top M greatest similarities) is made to obtain the M sessions most similar to the session $S_\tau$; then, the most similar M sessions are taken as neighbor sessions of the session $S_\tau$, and the session node $S_i$ is connected with their neighbor session nodes $S_j$ by edges $e_{ij}$, $e_{ij} \in \varepsilon_g$ and the session node $S_i$ is similar to the neighbor session nodes $S_j$ as a whole.

For the session $S_\tau$ and other sessions, the second long-term preference $z^l$ of the user is determined by using a long-term reading function according to the determined item embedding vector, which is expressed as:

$$z^l = \sum_{i=1}^{n} \alpha_i^l v_i \quad (8)$$
$$\alpha_i^l = \text{Softmax}(\beta_i^l)$$
$$\beta_i^l = W_5 \sigma(W_6 v_i + b^l)$$

where $W_5 \in R^{1 \times d}, W_6 \in R^{d \times d}$ are trainable parameters used to control weight in the attention mechanism, and $b^l \in R^d$ is a deviation vector.

In this embodiment, for the user's first long-term preference $z_i^d$ and second long-term preference $z^l$, the same item embedding vector and the same parameters for learning the item embedding vector are adopted, and different readout functions are adopted (a dynamic readout function shown in formula (2) combines the user's current preference and long-term preference at the same time, and a long-term readout function shown in formula (8) is used to obtain the user's long-term preference), and more accurate item recommendations can be obtained by collaborative learning of the dynamic preference and the second long-term preference.

Based on the constructed global graph, the session set U includes a neighbor session set $N_{S_\tau}$ composed of neighbor sessions $S_i$ connected with the session $S_\tau$ and a non-neighbor session set composed of non-neighbor sessions $\tilde{S}_j$ not connected with the session $S_\tau$, that is $S_i \in N_{S_\tau}, \tilde{S}_j \in U \backslash N_{S_\tau}$ ("\" represents a set subtraction operation). The similarities between the session $S_\tau$ and a neighbor session $S_i$ are greater than those between the session $S_\tau$ and the non-neighbor session $\tilde{S}_j$.

Based on this, JS divergence is used as the second loss function to maximize association between the session $S_\tau$ and its neighbor sessions and minimize association between the session $S_\tau$ and the non-neighbor session $\tilde{S}_j$. The second loss function is defined as:

$$L_{ssl} = -\log \sigma(f(S_\tau, S_i)) - \log(1 - \sigma(f(S_\tau, \tilde{S}_j))) \quad (9)$$

where, for two sessions $S_p$ and $S_q$, the function $f(.,.)$ is defined as:

$$f(S_p, S_q) = \sigma(z_p^{l^T} z_q^l) \quad (10)$$

where, $z_p^l$ is the second long-term preference of the user in the session $S_p$, $z_p^l$ is the second long-term preference of the user in the session $S_q$, and $\sigma$ is the sigmoid function.

According to the first loss function and the second loss function, a loss function L for joint training of the recommendation model is obtained, which is expressed as:

$$L = L_{main} + \lambda L_{ssl} \quad (11)$$

where λ is a loss weighing parameter. In some ways, a back propagation algorithm is used to update the loss function L to train the recommendation model, so that the recommendation model can output more accurate item recommendations.

In this embodiment, considering the current recommendation model, a t+1-th item is predicted by modeling the first T interactive items according to sequence behavior of the sessions, ignoring relationships between different sessions. Introduction of neighbor sessions can enrich information of the current session to make recommendations, but the introduction of neighbor sessions also introduces deviations, which affects the recommendation accuracy. By adopting the method of this embodiment, correlation between different sessions is established by constructing the global graph, and representation of the embedding vector of the item can be strengthened by comparing the long-term preference in each session with those of the neighboring sessions on the global graph, so that the accuracy of item recommendation can be improved.

As shown in FIGS. 2 and 3, the recommendation model includes a subject supervised learning part and a self-supervised learning part.

For the self-supervised learning part, the global graph is constructed according to all of the sessions; the neighbor sessions and non-neighbor sessions are determined by calculating the similarities between the session and other sessions; the second long-term preference of the session, the second long-term preferences of the neighbor sessions and the second long-term preferences of the non-neighbor sessions are calculated by using the long-term preference generator L-UPG according to the determined item embedding vector; and then, the second loss function Lssl is calculated according to the second long-term preference of the session and the second long-term preferences of the neighbor sessions and according to the second long-term preference of the session and the second long-term preferences of the non-neighbor sessions; finally, the recommendation model is jointly trained according to the first loss function Lmain and the second loss function Lssl to obtain an optimized recommendation model, and the optimized recommendation model is used to output accurate item recommendation results.

In some embodiments, in step S101, a directed session graph is constructed according to the session to represent a pair-based transfer relationship between the items it contains, which is expressed as $G_I=\{V_I,\varepsilon_I\}$, $V_I$ is a node of the directed session graph, $V_I=\{x_1,x_2,\ldots,x_m\}$ contains all the unique items in the session $S_\tau$ (that is, n items in the session $S_\tau$ are deduplicated to obtain $V_I$, m≤n), $\varepsilon_I$ represents the set of edges in the directed session graph, and each edge $e_{ij} \in \varepsilon_I$ indicates that the user clicks the item $x_j$ after clicking the item $x_i$.

An indegree matrix and an outdegree matrix are defined, which are used to represent a transfer relationship between the items in the directed session graph. Elements in the indegree matrix and outdegree matrix represent weights of different neighboring nodes in a process of information dissemination. Specific forms of the indegree matrix and the outdegree matrix are not specified.

After the directed session graph is constructed, information dissemination is performed based on the directed session graph to learn accurate representation of the embedding vector of the item. In some ways, after the directed session graph is constructed, the items in the directed session graph are input into the GGNN gated neural network model, and an embedding layer of the GGNN model initializes the input items as the embedding vectors of the items to obtain initialized embedding vectors of the items, which is expressed as $X^0=\{x_1^0,x_2^0,\ldots,x_m^0\}$ where $x_i^0 \in R^d$ is the embedding vector of the items $x_i$ and d is a dimension of the embedding vector of the item.

In a k-th layer of the GGNN model, information of neighbor nodes of a node $v_i$ (the node $v_i$ in GGNN model is the item $v_i$) is obtained, which is expressed as follows:

$$a_i^k = \text{Concat}(A_i^{in}[X_1^{k-1}, X_2^{k-1}, \ldots, X_m^{k-1}]W^I + b^I, \quad (12)$$
$$A_i^{out}[X_1^{k-1}, X_2^{k-1}, \ldots, X_m^{k-1}]W^o + b^I)$$

where $x_i^{k-1}$ represents the item embedding vector of the item $v_i$ at the k-1-th level, $A_i^{in}$ and $A_i^{out}$ are the i-the rows of the indegree matrix and the outdegree matrix respectively, which controls an amount of the information from the neighboring nodes of the node $v_i$ for updating the item embedding vector of the node. $v_i$ is a learnable parameter in the GGNN model, in which, $W^I$, $W^o$ are learnable weights of an indegree edge and an outdegree edge respectively, and $b^I$, $b^o$ are bias vectors.

Then, a gated recurrent unit GRU is used to combine the item embedding vector of the item $v_i$ in the k-1-th layer of the GGNN model with the information of neighboring nodes transmitted in the k-th layer to obtain the item embedding vector of the item $v_i$ in the k-th layer of the GGNN model, which is expressed as:

$$x_i^k = GRU(a_i^k, \mathbf{x_i^{k-1}}) \quad (13)$$

In some ways, the GGNN model with a multi-layer structure is combined with node information on different layers, and relationships between the items in the session are comprehensively considered. After k layers' superposition, the item embedding vector $X^k$ of the respective item in the session is obtained, which is simplified as X, $X=[x_1, x_2, \ldots, x_m]$, and then the item embedding vector which can reflect the items and relationships between the items can be obtained. Then, according to the directed session graph and the obtained item embedding vector of the respective item in the session, an item sequence $[v_1,v_2,\ldots,v_n]$ represented by the item embedding vector is obtained.

Recommendation effect that can be achieved by the recommendation method according to this embodiment is described in the following in combination with experimental data.

In some embodiments, two published data sets, Retailrocket and Gowalla, are used to verify the recommendation method provided in this disclosure. Retailrocket is a click data set of an e-commerce company, clicks of users within 24 hours are defined as a session, and Gowalla is a check-in data set, and check-ins of the users within 24 hours are defined as a session.

Session sets obtained from the two data sets are pre-processed respectively. The pre-processing method is to filter out items that appear less than 3 times, and filter out sessions that interact less than 2 times, so as to obtain pre-processed session sets. For the preprocessed session set, the session set is divided into a training set, a verification set and a test set according to a time sequence of the session, in which a proportion of the training set is 70%, that of the verification set is 10% and that of the test set is 20%. The statistics of the two data sets are shown in Table 1.

TABLE 1

Statistics for two data sets

| Data | Retailrocket | Gowalla |
| --- | --- | --- |
| Operation (click or check-in) | 337771 | 696273 |
| Item | 22144 | 56294 |
| Training item | 58804 | 130910 |
| Verifying item | 7407 | 16754 |
| Testing item | 14961 | 29234 |
| Average session length | 4.16 | 3.94 |
| Average operation number per item | 15.23 | 12.37 |

In some ways, the recommendation method of this embodiment (called CGL) is compared with existing recommendation methods. The existing methods include: recommending items that appear most frequently in the current session to the user (S-POP), recommending items similar to the current session to the user, measuring the similarities by cosine similarity (Item-KNN), using a Markov chain to model sequence signals (FPMC), using the GRU to model sequence behaviors in session-based recommendations (GRU4REC), using the attention mechanism to emphasize a main intention of users on the basis of GRU4REC (NARM), using the attention mechanism to realize dynamic user preference modeling (STAMP), using the GGNN to model the session and generate the session representation based on attention mechanism aggregation (SR-GNN), using the GAT to model the current session and enhancing it using a global level item representation on a global map (GCE-GNN), using a star pattern neural network to explore long-distance information in information dissemination and using a high-speed network to prevent an over-fitting problem (SGNN-HN).

For experimental results, evaluation indexes adopted are Recall@N and MRR@N, in which Recall@N is to verify whether the target item is in the recommendation list with N items, and MRR@N is a normalized hit, and with considering a position of the target item in the recommendation list, if the target item is outside a top k of the recommendation list, it will be set to 0; otherwise, it will be calculated according to the position in the recommendation list.

Experimental parameters are set as follows: a number of samples in one training, that is, batch size, is set to be 100, a dimension of the item embedding vector is set to be 100, an Adam optimizer is used as a model optimizer, an initial learning rate is set as 0.001, and a learning rate decays to 0.1 of a current learning rate after three cycles. A layer number of the GGNN model is set as 1, and other hyperparameters are adjusted on the verification set. The label weighting parameter $\alpha$ is selected from values in $\{8, 10, 12, 14, 16\}$, and the loss weighting parameter $\lambda$ is selected from values in $\{0.01, 0.05, 0.1, 0.2, 0.5\}$. A maximum number M of the neighbor nodes in the global graph is set to be 16, and all parameters $\psi$ (all the parameters involved in the model, that is, all the parameters mentioned above) are initialized using a Gaussian distribution, with an average value of 0 and a standard deviation of 0.1.

TABLE 2

Performance indexes of different recommended models

| | Retailrocket | | Gowalla | |
| --- | --- | --- | --- | --- |
| method | Recall@20 | MRR@20 | Recall@20 | MRR@20 |
| S-POP | 2.78 | 1.38 | 0.67 | 0.27 |
| Item-KNN | 16.12 | 7.56 | 3.99 | 1.62 |
| FPMC | 17.12 | 8.56 | 3.85 | 1.26 |
| GRU4REC | 28.21 | 16.43 | 5.74 | 2.24 |
| NARM | 41.80 | 27.38 | 7.40 | 2.93 |
| STAMP | 36.57 | 23.26 | 7.36 | 3.05 |
| SR-GNN | 44.96 | 28.61 | 8.34 | 3.58 |
| GCE-GNN | 36.38 | 21.50 | 8.33 | 3.31 |
| SGNN-HN | 45.06 | 29.09 | 9.74 | 3.90 |
| CGL | 47.86* | 29.47* | 12.14* | 4.99* |

As shown in Table 2, after analyzing several existing recommendation methods, general effect of the method based on the GNN model is better than that based on the RNN and the attention mechanism, which shows effectiveness of the GNN model in modeling a complex transfer relationship between items in the session. Compared with the method based on the GNN model, although GCE-GNN explored global information among the items, it failed to emphasize recent interest of users, resulting in unsatisfactory results, especially on the Retailrocket data set. SGNN-HN achieved good results by spreading long-distance information in the GNN model and alleviating the over-fitting problem.

In contrast, the recommendation method CGL of this embodiment is superior to the existing recommendation methods on two data sets in terms of the two indexes. On the Retailrocket data set, CGL is 6.21% higher than SGNN-HN ((47.86-45.06)/45.06=6.21%) in terms of a Recall@20 index, and CGL is 1.31% higher than SGNN-HN in terms of a MRR@20 index. On the Gowalla data set, CGL is 24.64% higher than SGNN-HN in terms of the Recall@20 and 27.95% higher than SGNN-HN in terms of the MRR@20.

It can be seen that the recommendation method of this embodiment has achieved better recommendation effect. On the one hand, relationships between the sessions are comprehensively considered to obtain supervision signals so as to enhance learning of the item embedding vector and improve the recommendation accuracy; and on the other hand, the target-based label confusion method can be adopted to effectively solve the over-fitting problem. In addition, the recommendation effect on the Gowalla data set is more obvious than that on the Retailrocket data set, which indicates that the method of this embodiment has more obvious effect on large-scale data sets by solving problems of lack of supervision signals and over-fitting.

TABLE 3

Comparative results of ablation experiments

| | Retailrocket | | Gowalla | |
| --- | --- | --- | --- | --- |
| method | Recall@20 | MRR@20 | Recall@20 | MRR@20 |
| CGL | 47.86 | 29.47 | 12.14 | 4.99 |
| $CGL_{w/o[SSL]}$ | 44.76 | 28.99 | 10.98 | 4.54 |
| $CGL_{w/o[LC]}$ | 44.16 | 27.61 | 8.87 | 3.81 |
| $CGL_{LS}$ | 45.47 | 28.59 | 10.60 | 4.43 |

In order to verify effectiveness of the self-supervised learning part and the label confusion method, an ablation experiment was conducted. $CGL_{w/o[SSL]}$ is a method variant without self-supervised learning, $CGL_{w/o[LC]}$ is a method variant without label confusion, and $CGL_{LS}$ is a method variant that replaces the label confusion in the CGL with label smoothing. As shown in Table 3, compared with $CGL_{w/o[SSL]}$ and $CGL_{w/o[LC]}$, CGL has best performance, which indicates that the self-supervised learning part and the label confusion method can improve the recommendation accuracy. Through the ablation experiment, removal of the label confusion will reduce the performance of the recommendation model on both data sets compared with removal of the self-supervised learning part, indicating that over-fitting is a common and serious problem in different situations, which limits the recommendation accuracy.

Comparing CGL with $CGL_{w/o[SSL]}$, performance in terms of the Recall@20 and MRR@20 indexes on the Retailrocket data set is decreased by 6.48% and 1.63% respectively after the self-supervised learning part was removed, and the two indexes on the Gowalla data set are decreased by 9.56% and 9.02% respectively, which is more than that on the Retailrocket data set, possiblely because interactions of each item for the Gowalla data set is less than that for the Retailrocket data set. Combined with Table 1, there are fewer self-monitoring signals in the Gowalla data set compared with the Retailrocket data set. Therefore, by using the self-monitoring signals of the self-monitoring learning part, accurate embedding vectors of the items and accurate recommendations can be obtained.

Without using the label confusion method, compared with the Retailrocket data set, the two indexes on the Gowalla data set present a larger decline. It may be because numbers of candidate items in the two data sets are different. As shown in Table 1, the number of items in the Gowalla data set is more than that in the Retailrocket data set, which is more likely to lead to over-fitting. Because a distribution of one-hot codes in cross entropy is likely to cause overconfidence, the over-fitting problem is correspondingly more serious in the Gowalla data set than in the Retailrocket data set. In the recommendation method of this embodiment, the label confusion method is used to solve the over-fitting problem, and performance improvement on the Gowalla data set is more obvious than that on the Retailrocket data set.

Comparing $CGL_{LS}$ with $CGL_{w/o[LC]}$, the label smoothing can also facilitate improving performance of the recommendation model, because both the label smoothing and the label confusion method can solve the serious over-fitting problem to some extent. Furthermore, the label confusion method adopted in this embodiment is more effective than the label smoothing, because CGL can generate the soft label vector according to the similarities between other items and the target item, while the label smoothing does not distinguish the soft label vector. Therefore, the label confusion method is more effective than the label smoothing, so that CGL is obviously superior to $CGL_{LS}$.

As shown in FIGS. 4A, 4B, 4C and 4D, in most cases, performance of CGL on two data sets is better than that of $CGL_{w/oSSL}$ for the label weighing parameter a with different values (taken from a set {8, 10, 12, 14, 16}), which indicates that the self-supervised learning part is effective in solving the over-fitting problem in different degrees.

On the Retialrocket data set, with increasing of the label weighting parameter $\alpha$, the performance of both CGL and $CGL_{w/oSSL}$ firstly increases, and when $\alpha$ is equal to 10, the performance reaches a peak, and then shows a trend of continuous decline. This may be because when the label weighting parameter $\alpha$ is small, the label distribution is less dependent on the one-hot coded hard label vector, which may lead to performance degradation due to introduction of errors. When the label weighting parameter $\alpha$ increases, the performance is excessively dependent on the hard label vector, which may lead to the over-fitting problem. In fact, when the label weighting parameter $\alpha$ is large enough, the label confusion method will be equivalent to the hard label vector. There is a same problem on the Gowalla data set. A difference is that for $CGL_{w/o[SSL]}$, performance of the Recall@20 is relatively stable when the label weighing parameter $\alpha$ changes, which may be due to a fact that the introduced self-monitoring signal may aggravate the over-fitting problem. Therefore, the label confusion method has a greater influence on CGL than $CGL_{w/o[SSL]}$ in hitting the target item in the recommendation list.

Combined with FIGS. 5A, 5B, 5C and 5D, performance of CGL on both of the two data sets is better than that of $CGL_{w/o[LC]}$ for the loss weighting parameter λ with different values (taken from a set {0.01, 0.05, 0.1, 0.2, 0.5}), which indicates that the label confusion method can improve the performance of the recommendation model in a case of introducing self-monitoring signals of different magnitudes.

On the Retailrocket data set, with increasing of the loss weighting parameter λ, performance of CGL on in terms of the Recall@20 and MRR@20 is firstly increased and then shows a decreasing trend. This is because when the loss weighting parameter λ is small, the introduced self-monitoring signal is not enough to enhance the representation of the embedding vector, while when the loss weighting parameter λ is large, introduction of excessive self-monitoring signals may lead to over-fitting and reduce the performance. Therefore, when the loss balance parameter λ is 0.1, the recommendation model provides best effect.

For $CGL_{w/o[LC]}$, with increasing of the loss weighting parameter λ, performance in terms of the Recall@20 and MRR@20 first fluctuates, and then continuously increases. Different trends in CGL and $CGL_{w/o[LC]}$ may be due to a fact that the subject supervised learning part in CGL has been able to learn an accurate item embedding vector by using the label confusion method, and there is no need to introduce additional self-supervised signals from the self-supervised learning part too much, so a smaller loss weighting parameter λ is suitable for collaborative learning. On the Gowalla data set, the experimental results are the same. When the loss weighting parameter λ is 0.5, performance of CGL in terms of the Recall@20 and MRR@20 reaches the optimal.

To verify effectiveness of the GGNN model in the method of this embodiment, the GGNN in CGL is replaced with RNN, denoted by CRNNL, the GGNN in CGL is replaced with the self-attention mechanism, denoted by CSATL, and in comparison, effectiveness of the item embedding vector of this embodiment is verified. The dynamic readout function in CGL is replaced with the long-term read-out function, represented by $CGL_{w/o[d]}$. In comparison, necessity of adopting different aggregation methods between the subject supervised learning part and the self-supervised learning part is verified.

TABLE 4

Model performance of different user preferences

| | Retailrocket | | Gowalla | |
|---|---|---|---|---|
| Method | Recall@20 | MRR@20 | Recall@20 | MRR@20 |
| CGL | 47.86 | 29.47 | 12.14 | 4.99 |
| CSATL | 47.79 | 28.74 | 11.74 | 4.48 |
| CRNNL | 44.68 | 28.46 | 11.60 | 4.59 |
| $CGL_{w/o[d]}$ | 39.65 | 24.91 | 12.12 | 4.60 |

As shown in Table 4, compared with CRNNL and CSATL, CGL presents a best effect on two data sets in terms of the Recall@20 and MRR@20 indexes, which indicates that the GGNN model can accurately model transfer relationships between different items in a session, thus generating an accurate item embedding vector. The self-attention mechanism in CSTAL can be regarded as a fully connected GNN, in which each item spreads information from all of the items in the session, which may cause problems of over-fitting and over-smoothing and reduce performance of CSTAL. Comparing CRNNL with CSATL, in most cases, performance of CRNNL is lower than that of CSATL, which may be due to a fact that a user's behavior pattern in the session is more complicated than a sequence order. Furthermore, it is not appropriate to introduce sequence information for user preference modeling in the self-supervised learning part, because similarity between two sessions is referred as a whole and has no specific relationship with an interest change modeled by RNN.

For CGL and $CGL_{w/o[d]}$, when the user's dynamic preference is replaced with the long-term preference, the two indexes are obviously degrade. On the Retailrocket data set, influences on the Recall@20 and MRR@20 indexes are similar, with a decrease of 17.15% and 15.47% respectively, and on the Gowalla data set, with a decrease of 0.16% and 7.82% respectively, which indicates that in a check-in scene, modeling user's dynamic interest by emphasizing recent interactions can more effectively recommend the target item to a more top ranked position.

Recommendation effect of the recommendation method of this embodiment is verified for sessions of different lengths. Sessions with no more than 4 items are regarded as short sessions, and sessions with more than 4 items are regarded as long sessions. In the sample data shown in Table 1, the proportions of short sessions and long sessions are 83.90% and 16.10% respectively on the Retailrocket data set, and 91.58% and 8.42% respectively on the Gowalla data set.

As shown in FIGS. 6A, 6B, 6C and 6D, for sessions of different lengths, performance of CGL is good. Performance of other models on the Retailrocket data set is reduced from short sessions to long sessions, and performance of the other models on the Gowalla data set is improved. This is because in an e-commerce platform, users' intentions are varied, and users may pay attention to similar places in the check-in scene. Therefore, on the Retailrocket dataset, a relatively large number of items may mislead the model to identify users' current preferences, while on the Gowalla dataset, with more check-in data, the users' preferences can be determined more accurately.

On the Retailrocket data set, performance of SR-GNN in terms of the two indexes is good in short sessions, but is poor long sessions, which indicates that exploring long-distance items in information dissemination is very important for obtaining user preferences with more interactions. In addition, for the long sessions and the short sessions, the MRR@20 index degrades more obviously, which indicates that for long sessions, it is difficult to recommend the target item to a top ranked position of the recommendation list.

On the Gowalla data set, performance of the GNN-based method is obviously better than that of NARM and STAMP in the short sessions, and performance of SR-GNN and GCE-GNN is similar to that of NARM and STAMP in the long sessions. This may be due to a fact that with increasing of a session length, a transfer relationship between the sessions becomes more complicated, and relationships between the items cannot be accurately modeled with the GNN. However, CGL can still show better performance than other existing models, which indicates that the over-fitting problem can be effectively avoided and the embedding vector of the item can be accurately learned, by introducing self-monitoring signals.

It should be noted that the method of one or more embodiments of this disclosure can be performed by a single device, such as a computer or a server. The method of this embodiment can also be applied to distributed scenarios, which is completed by cooperation of multiple devices. In this distributed scenario, one of the devices can only perform one or more of the steps in the method of one or more embodiments of this disclosure, and the devices can interact with each other to complete the method.

It should be noted that specific embodiments of this disclosure have been described above. Other embodiments are within the scope of the appended claims. In some cases, actions or steps recited in the claims may be performed in a different order from that in the embodiments and still achieve the desired results. In addition, the processes depicted in the drawings do not necessarily require the specific or sequential order shown to achieve the desired results. In some embodiments, multitasking and parallel processing are also possible or may be advantageous.

Figure 7:
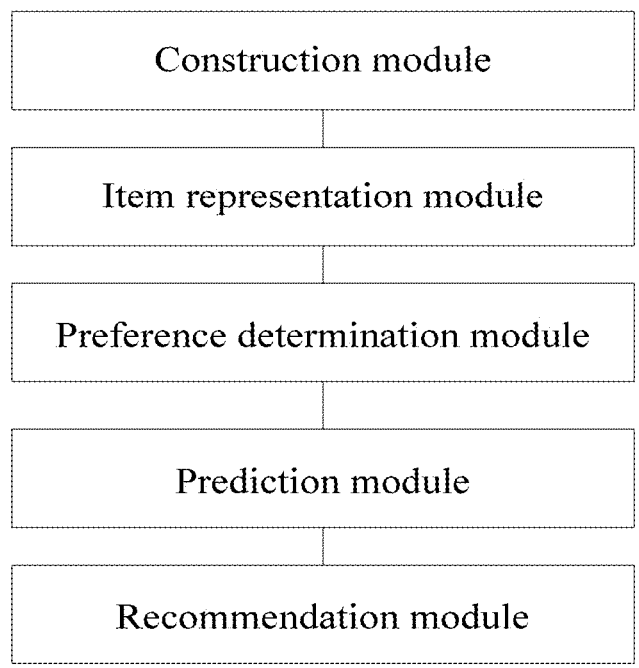
FIG. 7 is a schematic diagram of a device structure according to one or more embodiments of this disclosure.

As shown in FIG. 7, a session-based recommendation device is provided in an embodiment of this disclosure, which includes a construction module, an item representation module, a preference determination module, a prediction module and a recommendation module.

The construction module is configured for constructing a directed session graph according to a session to be predicted, and the session includes at least one item that a user interacts with a system.

The item representation module is configured for inputting the directed session graph into a gated graph neural network which outputs an item embedding vector.

The preference determination module is configured for determining a dynamic preference of the user according to a current preference and a first long-term preference of the user. The first long-term preference is determined according to the item embedding vector and an importance score of the item.

The prediction module is configured for determining a prediction score of a respective item according to the dynamic preference and the item embedding vector.

The recommendation module is configured for outputting a recommended item according to the prediction scores of the respective items.

For convenience of description, when the above devices are described, it is made for various modules in terms of functions. Of course, when one or more embodiments of this disclosure are implemented, the functions of each module can be implemented in one or more pieces of software and/or hardware.

The device in the above embodiments is used to implement the corresponding method in the above embodiments, and present beneficial effects of the corresponding method embodiments, which will not be described in detail here.

Figure 8:
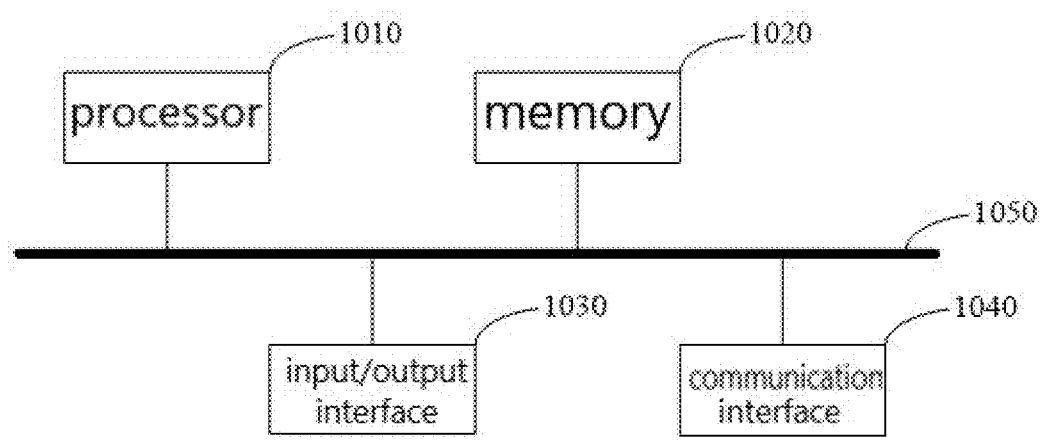
FIG. 8 is a schematic diagram of a structure of an electronic device according to one or more embodiments of this disclosure.

FIG. 8 shows a more specific hardware structure diagram of an electronic device provided in this embodiment, which may include a processor 1010, a memory 1020, an input/output interface 1030, a communication interface 1040 and a bus 1050. A communication connection with each other is realized among the processor 1010, the memory 1020, the input/output interface 1030 and the communication interface 1040 in the device through the bus 1050.

The processor 1010 can be implemented by a general-purpose CPU (Central Processing Unit), a microprocessor, an application specific integrated circuit (ASIC), or one or more integrated circuits, etc., and is used for executing relevant programs to realize technical schemes provided in the embodiments of this disclosure.

The memory 1020 can be implemented in a form of ROM (Read Only Memory), RAM (Random Access Memory), static storage device, dynamic storage device, or the like. The memory 1020 can store the operating system and other application programs. When the technical schemes provided in the embodiments of this disclosure is implemented by software or firmware, relevant program codes are stored in the memory 1020 and called and executed by the processor 1010.

The input/output interface 1030 is used to connect the input/output module to realize information input and output. The input/output module can be configured as a component in the device (not shown in the figure), or it can be externally connected to the device to provide corresponding functions. An input device can include a keyboard, a mouse, a touch screen, a microphone and various sensors, and an output device can include a display, a speaker, a vibrator and an indicator.

The communication interface 1040 is used to connect with a communication module (not shown in the figure) to realize communication interaction between the device and other devices. The communication module can communicate by wired means (such as USB, network cable, etc.) or by wireless means (such as mobile network, WIFI, Bluetooth, etc.).

The bus 1050 includes a path for transmitting information among various components of the device, such as the processor 1010, the memory 1020, the input/output interface 1030 and the communication interface 1040.

It should be noted that although the above device only shows the processor 1010, the memory 1020, the input/output interface 1030, the communication interface 1040 and the bus 1050, in the specific implementation process, the device may also include other components necessary for normal operation. In addition, it can be understood by those skilled in the art that the above-mentioned device may only contain the components necessary for implementing the embodiments of this disclosure, and need not contain all the components shown in the drawings.

The electric device in the above embodiments is used to implement the corresponding method in the above embodiments, and present beneficial effects of the corresponding method embodiments, which will not be described in detail here.

The computer-readable media of this embodiment includes permanent or non-permanent, removable or non-removable media, and information storage can be realized by any method or technology. The information can be a computer-readable instruction, a data structure, a module of programs, or other data. Examples of the storage media of computers include, But not limited to phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic tape cartridge, magnetic tape, magnetic disk storage or other magnetic storage devices or any other non-transmission medium that can be used to store information that can be accessed by computing devices.

It should be understood by those of ordinary skill in the art that discussion of any of the above embodiments is only exemplary, and is not intended to imply that the scope of the disclosure (including the claims) is limited to these examples; under the idea of this disclosure, the technical features in the above embodiments or different embodiments can also be combined, and the steps can be realized in any order; and there are many other changes in different aspects of one or more embodiments of this disclosure as described above, which are not provided in details for brevity.

In addition, in order to simplify the description and discussion, and in order not to make the one or more embodiments of this disclosure difficult to understand, well-known power/ground connections with integrated circuit (IC) chips and other components may or may not be shown in the provided drawings. In addition, the devices can be shown in the form of block diagrams in order to avoid making the one or more embodiments of this disclosure difficult to understand, and this also takes into account the fact that the details about the implementation of these devices in block diagram are highly dependent on a platform on which the one or more embodiments of this disclosure will be implemented (i.e., these details should be completely within an understanding range of those skilled in the art). While specific details (e.g., circuits) have been set forth to describe exemplary embodiments of the present disclosure, it will be apparent to those skilled in the art that the one or more embodiments of this disclosure may be practiced without these specific details or with variations in these specific details. Therefore, these descriptions should be regarded as illustrative rather than restrictive.

Although the present disclosure has been described in conjunction with specific embodiments thereof, many alternatives, modifications and variations of these embodiments will be apparent to those of ordinary skill in the art based on the foregoing description. For example, the discussed embodiments can be applied in other memory architectures (such as dynamic RAM (DRAM)).

One or more embodiment of the present disclosure are intended to cover all such alternatives, modifications and variations that fall within the broad scope of the append claims. Therefore, any omissions, modifications, equivalent substitutions, improvements, etc. made within the spirit and principles of one or more embodiment of this disclosure shall be encompassed within the protection scope of this disclosure.

What is claimed is:

1. A session-based recommendation method executed by a processor which uses a pre-trained recommendation model to recommend items, wherein the method comprises:
   constructing a directed session graph according to a session to be predicted, the session comprising at least one item that a user interacts with a system;
   inputting the directed session graph into a gated graph neural network which outputs an item embedding vector;
   determining a dynamic preference of the user according to a current preference and a first long-term preference of the user by training the pre-trained recommendation model, wherein the training comprises utilizing a back propagation algorithm to update a loss function L, the loss function L is expressed as:

$$L = L_{main} + \lambda L_{ssl}$$

where λ is a loss weighing parameter, $L_{main}$ is a first loss function, and $L_{ssl}$ is a second loss function,
the first loss function is determined according to:

$$L_{main} = \sum_{i=1}^{|V|} y_i^c \log\left(\frac{y_i^c}{y_i^p}\right)$$

where $y_i^c$ is a label distribution of an item $v_i$ and $y_i^p$ is a predicted score of an item $v_i$,
the second loss function is determined according to:

$$L_{ssl} = -\log \sigma(f(S_v, S_i)) - \log(1 - \sigma(f(S_v, \tilde{S}_j)))$$

where, for two sessions $S_p$ and $S_q$, the function f ( ) is defined as:

$$f(S_p, S_q) = \sigma(z_p^{lT} z_q^l)$$

where, $z_p^{lT}$ is a transpose of a second long-term preference of the user in a session $S_p$, $z_q^l$ is a second long-term preference of a user in a session $S_q$, and σ is a sigmoid function,
the current preference being an item embedding vector of a last item in the session and the first long-term preference being determined according to the item embedding vector and an importance score of the at least one item that the user interacts with the system, wherein the dynamic preference is determined according to:

$$z^d = \text{Readout}_d(v_{1:n}) = W_1[z_l^d; z_r^d];$$

wherein $z^d$ is the dynamic preference, $\text{Readout}_d$ is a dynamic read function used in the gated graph neural network to aggregate node features to obtain a representation vector of the whole graph, (;) is a connection operation, an embedded item vector $V = \{v_1, v_2, \ldots, v_{|v|}\}$ is a vector that represents all of the items, where $|V|$ is a number of the items in V, d is a dimension of the embedded item vector, $W_1 \in R^{d \times 2d}$ is a trainable parameter used to control weights where R represents a set of real numbers, $z_r^d$ is the current preference, $z_l^d$ is the first long-term preference, and $z_l^d$ is calculated according to:

$$z_l^d = \sum_{i=1}^{n} \alpha_i^d v_i;$$

where $$\alpha_i^d = \text{Soft max}(\beta_i^d)$$

$$\beta_i^d = W_2 \sigma(W_3 v_i + W_4 z_r^d + b^d);$$

$W_2 \in R^{1 \times d}, W_3, W_4 \in R^{d \times d}$ are trainable parameters used to control weights in an attention mechanism, $b^d \in R^d$ is a bias vector, σ is a sigmoid function, and i is an integer;
determining a prediction score of a respective item according to the dynamic preference and the item embedding vector; and
outputting a recommended item according to the prediction score of the respective item.

2. The method according to claim 1, further comprising, after determining the prediction score of the respective item:
calculating a label distribution of the respective item;
determining the first loss function according to the prediction score and the label distribution; and
optimizing the recommendation model according to the first loss function.

3. The method according to claim 2, wherein calculating the label distribution of the respective item comprises:
calculating similarities between a target item and all of the items in an item set to obtain a soft label vector constructed of the similarities between the target item and all of the respective items;
one-hot coding all of the items to obtain hard label vectors of all of the items represented by one-hot coding; and
determining the label distribution according to the soft label vector and the hard label vectors.

4. The method according to claim 1, further comprising:
calculating similarities between the session and other sessions;
determining neighbor sessions with top m greatest similarities and remaining non-neighbor sessions;
calculating respective second long-term preferences according to the session, the neighbor sessions and the non-neighbor sessions respectively;
determining the second loss function according to the second long-term preferences for the session, the neighbor sessions and the non-neighbor sessions; and
optimizing the recommendation model according to the first loss function and the second loss function.

5. The method according to claim 4, wherein the first long-term preference is determined by a dynamic readout function, and the second long-term preferences are determined by a long-term readout function.

6. The method according to claim 4, wherein the first loss function is a divergence function and the second loss function is a JS divergence function.

7. The method according to claim 1, wherein the importance score of the item is generated by the attention mechanism.

8. A session-based recommendation device which uses a pre-trained recommendation model to recommend items, wherein the device comprises:
a construction module configured for constructing a directed session graph according to a session to be predicted, the session comprising at least one item that a user interacts with a system;
an item representation module configured for inputting the directed session graph into a gated graph neural network which outputs an item embedding vector;
a preference determination module configured for determining a dynamic preference of the user according to a current preference and a first long-term preference of the user by training the pre-trained recommendation model, wherein the training comprises utilizing a back propagation algorithm to update a loss function L, the loss function L is expressed as:

$$L = L_{main} + \lambda L_{ssl}$$

where λ is a loss weighing parameter, $L_{main}$ is a first loss function, and $L_{ssl}$ is a second loss function,
the first loss function is determined according to:

$$L_{main} = \sum_{i=1}^{|V|} y_i^c \log\left(\frac{y_i^c}{y_i^p}\right)$$

where $y_i^c$ is a label distribution of an item $v_i$ and $y_i^p$ is a predicted score of an item $v_i$, the second loss function is determined according to:

$$L_{ssl} = -\log \sigma(f(S_v, S_i)) - \log(1 - \sigma(f(S_v, \tilde{S}_j)))$$

where, for two sessions $S_p$ and $S_q$, the function f ( ) is defined as:

$$f(S_p, S_q) = \sigma(z_p^{lT} z_q^{l})$$

where, $z_p^{lT}$ is a transpose of a second long-term preference of the user in a session $S_p$, $z_q^{l}$ is a second long-term preference of a user in a session $S_q$, and $\sigma$ is a sigmoid function, the current preference being an item embedding vector of a last item in the session and the first long-term preference being determined according to the item embedding vector and an importance score of the at least one item that the user interacts with the system, wherein the dynamic preference is determined according to:

$$z^d = \text{Readout}_d(v_{1:n}) = W_1[z_l^d; z_r^d];$$

wherein $z^d$ is the dynamic preference, $\text{Readout}_d$ is a dynamic read function used in the gated graph neural network to aggregate node features to obtain a representation vector of the whole graph, (;) is a connection operation, an embedded item vector $V = \{v_1, v_2, \ldots, v_{|v|}\}$ is a vector that represents all of the items, where $|V|$ is a number of the items in V, d is a dimension of the embedded item vector, $W_1 \in R^{d \times 2d}$ is a trainable parameter used to control weights where R represents a set of real numbers, $z_r^d$ is the current preference, $z_l^d$ is the first long-term preference, and $z_l^d$ is calculated according to:

$$z_l^d = \sum_{i=1}^{n} \alpha_i^d v_i;$$

where $$\alpha_i^d = \text{Soft max}(\beta_i^d)$$

$$\beta_i^d = W_2 \sigma(W_3 v_i + W_4 z_r^d + b^d);$$

$W_2 \in R^{1 \times d}, W_3, W_4 \in R^{d \times d}$ are trainable parameters used to control weights in an attention mechanism, $b^d \in R^d$ is a bias vector, $\sigma$ is a sigmoid function, and i is an integer;

a prediction module configured for determining a prediction score of a respective item according to the dynamic preference and the item embedding vector; and a recommendation module configured for outputting a recommended item according to the prediction scores of the respective items.

9. The device according to claim 8, further comprising:
a first calculation module configured for calculating a label distribution of the respective item, and
an optimization module configured for determining a first loss function according to the prediction score and the label distribution; and for optimizing the recommendation model according to the first loss function.

10. The device according to claim 8, further comprising:
a second calculation module configured for calculating similarities between the session and other sessions;
a neighbor determination module configured for determining neighbor sessions with top m greatest similarities and remaining non-neighbor sessions;
a second preference determination module configured for calculating respective second long-term preferences according to the session, the neighbor sessions and the non-neighbor sessions respectively; and
a joint optimization module configured for determining a second loss function according to the second long-term preferences for the session, the neighbor sessions and the non-neighbor sessions; and for optimizing the recommendation model according to the first loss function and the second loss function.

\* \* \* \* \*